United States Patent
Wolf et al.

(10) Patent No.: US 9,709,847 B2
(45) Date of Patent: Jul. 18, 2017

(54) LIQUID CRYSTAL DISPLAY BACKLIGHT

(71) Applicant: ROBO-TEAM LTD., Tel Aviv (IL)

(72) Inventors: Yosi Wolf, Tel-Aviv (IL); Mor Rotbart, Herzliya (IL); Mark Vaynberg, Petach-Tikva (IL); Elad Levy, Tel-Aviv (IL); Gregory Heifets, Rehovot (IL)

(73) Assignee: ROBO-TEAM DEFENSE LTD., Tel-Aviv (IL)

( * ) Notice: Subject to any disclaimer, the term of this patent is extended or adjusted under 35 U.S.C. 154(b) by 96 days.

(21) Appl. No.: 14/557,556

(22) Filed: Dec. 2, 2014

(65) Prior Publication Data

US 2015/0346525 A1 Dec. 3, 2015

(30) Foreign Application Priority Data

May 29, 2014 (IL) .......................................... 232888

(51) Int. Cl.
*G09G 5/02* (2006.01)
*G02F 1/1335* (2006.01)
*F21V 8/00* (2006.01)
*F21V 9/04* (2006.01)
*F21V 23/04* (2006.01)
*G09G 5/10* (2006.01)

(52) U.S. Cl.
CPC .............. *G02F 1/1336* (2013.01); *F21V 9/04* (2013.01); *F21V 23/04* (2013.01); *G02B 6/0025* (2013.01); *G02B 6/0026* (2013.01); *G02B 6/0068* (2013.01); *G02F 1/133509* (2013.01); *G02F 1/133615* (2013.01); *G09G 5/10* (2013.01); *G02B 6/0076* (2013.01); *G02F 2001/133626* (2013.01)

(58) Field of Classification Search
CPC ....... G02F 2001/133626–2001/133627; G09G 5/10
See application file for complete search history.

(56) References Cited

U.S. PATENT DOCUMENTS

| 5,143,433 A | 9/1992 | Farrell |
| 5,211,463 A | 5/1993 | Kalmanash |
| 5,479,275 A | 12/1995 | Abileah |
| 6,111,622 A | 8/2000 | Abileah |
| 6,352,350 B1 * | 3/2002 | Ma .............................. F21V 9/14 349/63 |

(Continued)

*Primary Examiner* — Charles Tseng
(74) *Attorney, Agent, or Firm* — Roach Brown McCarthy & Gruber, P.C.; Kevin D. McCarthy

(57) ABSTRACT

A backlight layer to be operatively coupled with an LCD panel, the backlight layer comprising: an illumination source configured to illuminate the LCD panel; a dual-mode infrared filter configured to filter an infrared spectrum of light emanating from the illumination source, wherein: when the dual-mode infrared filter is in an enabled mode, the dual-mode infrared filter is positioned in the path of the light emanating from the illumination source and before the light reaches the LCD panel, thereby filtering an infrared spectrum of the light, and when the dual-mode infrared filter is in a disabled mode, the dual-mode infrared filter is positioned out of the path of light emanating from the illumination source, thereby allowing a complete spectrum of the light to reach the LCD panel.

4 Claims, 5 Drawing Sheets

(56) References Cited

U.S. PATENT DOCUMENTS

| | | | |
|---|---|---|---|
| 6,574,030 B1* | 6/2003 | Mosier | G02B 23/12 345/46 |
| 6,639,349 B1 | 10/2003 | Bahadur | |
| 6,789,921 B1 | 9/2004 | Deloy et al. | |
| 2002/0080105 A1* | 6/2002 | Sato | G02F 1/133621 345/87 |
| 2002/0186976 A1* | 12/2002 | Seo | G03B 17/48 396/429 |
| 2003/0071934 A1 | 4/2003 | Saccomanno et al. | |
| 2005/0094391 A1 | 5/2005 | Campbell et al. | |
| 2006/0187380 A1* | 8/2006 | Tsuda | G02B 6/0056 349/96 |
| 2007/0058108 A1* | 3/2007 | Uehara | G02B 6/005 349/86 |
| 2007/0171623 A1* | 7/2007 | Zagar | B60K 35/00 362/23.12 |
| 2008/0112187 A1* | 5/2008 | Katsumata | G02B 6/0068 362/611 |
| 2008/0316568 A1 | 12/2008 | Griffiths et al. | |
| 2009/0015791 A1* | 1/2009 | Chang | G03B 21/00 353/6 |
| 2012/0105765 A1* | 5/2012 | Kawai | G02F 1/133605 349/62 |
| 2014/0036533 A1* | 2/2014 | Smith-Gillespie | G02F 1/133615 362/609 |

\* cited by examiner

LIQUID CRYSTAL DISPLAY BACKLIGHT

FIELD OF THE INVENTION

The invention relates to the field of liquid crystal display backlights.

BACKGROUND

Night vision is the ability to see in low light conditions. Whether by biological or technological means, night vision is made possible by a combination of two approaches: sufficient spectral range, and sufficient intensity range. Night-useful spectral range techniques may allow sensing radiation that is invisible to a human observer. Human vision is confined to a small portion of the electromagnetic spectrum called visible light. Enhanced spectral range allows the viewer to take advantage of non-visible sources of electromagnetic radiation such as near-infrared or ultraviolet radiation.

A liquid crystal display (LCD) may be based on one or more circuit platforms such as PCB (printed circuit board) with one or more illumination sources such as LED (light emitting diodes), CCFL (cold cathode fluorescent lamps), Electro-luminescent panel, etc. An LCD display may be illuminated by one or more illumination methods such as a side illumination source, a peripheral illumination source, an array illumination source, a matrix illumination source, etc. In addition, LCD panels may use a light diffuser such as a light guide. A light guide may be made from materials such as acrylic resin, polycarbonate, epoxies, and/or glass that diffuses light emanating from the illumination source, such that the light may be evenly spread across the panel.

U.S. Patent Application Publication No. 2014/036533 to Smith Gillespie discloses LCD backlighting systems, and particularly LCD backlighting systems used in connection with night vision systems. The LCD backlighting systems may be configured to achieve reduced cost, reduced volume, and other desirable outcomes by use of a dual-mode configuration. In a dual-mode configuration, certain light sources are active in both day mode and night mode operation. Night mode light sources may be IR filtered in order to prevent disruption of operation of night vision equipment.

U.S. Pat. No. 6,111,622 to Abileah discloses a backlit liquid crystal display device having improved nighttime operational characteristics. The backlit liquid crystal display device includes a fluorescent lamp for daytime operation and a separate light source for nighttime operation which emits a low-intensity light. Preferably, the nighttime light source may be an electroluminescent panel which also acts as a daytime reflector of light. An integral image-splitting and collimating lens is provided to increase the uniformity of the light emitted and to provide wide angle view ability. A sharp cut-off IR filter may also be included in the device to provide NVIS-B night vision goggle compatibility.

U.S. Pat. No. 5,143,433 to Farrell discloses LCD designed with backlighting systems which presents a way to provide night vision viewing compatibility of backlit electro-optic modulated light valve or LCD displays designed for daylight viewing. LCD designed with backlighting systems may provide a high brightness, good contrast display under daylight conditions are inappropriate for use in dark, night time conditions where viewing of the display may be desired utilizing electronic night vision equipment. LCD designed with backlighting systems describes improvements to standard backlighting displays which through the utilization of arrays of low-level intensity light sources such as secondary fluorescent light sources, miniature incandescent lamps or light emitting diodes, the general means used in daylight vision can be turned off and the secondary low-level lighting sources achieve a minimum intensity acceptable for night vision electronic viewing.

U.S. Pat. No. 5,211,463 to Kalmanash discloses a backlight system for liquid crystal device display which may be equipped with a dual lighting system for day viewing and compatible with night vision systems. The day lighting system uses conventional fluorescent or incandescent lamps for full color display during daytime use. The night lighting system uses a light source which may be either filtered to remove infrared and near infrared wavelengths or which may be chosen from a class of sources which does not emit such wavelengths. The day lighting system is disabled while the night system is in use.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

There is provided, in accordance with an embodiment, a backlight layer to be operatively coupled with an LCD panel, the backlight layer comprising: an illumination source configured to illuminate the LCD panel; a dual-mode infrared filter configured to filter an infrared spectrum of light emanating from the illumination source, wherein: when the dual-mode infrared filter is in an enabled mode, the dual-mode infrared filter is positioned in the path of the light emanating from the illumination source and before the light reaches the LCD panel, thereby filtering an infrared spectrum of the light, and when the dual-mode infrared filter is in a disabled mode, the dual-mode infrared filter is positioned out of the path of light emanating from the illumination source, thereby allowing a complete spectrum of the light to reach the LCD panel.

There is provided, in accordance with another embodiment, a liquid crystal display (LCD) assembly comprising: an LCD panel; a first backlight layer positioned beneath the LCD panel, the backlight layer comprising a first illumination source configured to illuminate the LCD panel; and a dual-mode infrared filter, configured to filter an infrared spectrum of light emanating from the illumination source, wherein: when the dual-mode infrared filter is in an enabled mode, the dual-mode infrared filter is positioned in the path of the light emanating from the illumination source and before the light reaches the LCD panel, thereby filtering an infrared spectrum of the light, and when the dual-mode infrared filter is in a disabled mode, the dual-mode infrared filter is positioned out of the path of light emanating from the illumination source, thereby allowing a complete spectrum of the light to reach the LCD panel.

There is provided, in accordance with yet another embodiment, a method for operating an LCD assembly, the LCD assembly comprising a backlight layer operatively coupled with an LCD panel, the backlight layer comprising a first illumination source configured to illuminate the LCD panel and a dual-mode infrared filter, the method comprising using at least one hardware processor for: receiving a mode selection; if the mode selection is night vision, setting the first illumination source and the dual-mode infrared filter to an enabled mode; and if the mode selection is daylight vision, setting the first illumination source to an enabled mode and the dual-mode filter to a disabled mode, wherein: when the dual-mode infrared filter is in an enabled mode, the dual-mode infrared filter is positioned in the path of the light emanating from the first illumination source and before the light reaches the LCD panel, thereby filtering an infrared spectrum of the light, and when the dual-mode infrared filter is in a disabled mode, the dual-mode infrared filter is positioned out of the path of light emanating from the first illumination source, thereby allowing a complete spectrum of the light to reach the LCD panel.

In some embodiments, the backlight layer further comprises a moving mechanism operatively coupled with the dual-mode infrared filter, wherein the moving mechanism is configured to move the dual-mode infrared filter into and out of the path of light emanating from the illumination source.

In some embodiments, the backlight layer further comprises a lightguide panel, wherein the illumination source is positioned at an edge of the lightguide panel, and wherein the lightguide panel is configured to diffuse said light emanating from the illumination source on said LCD panel.

In some embodiments, the backlight layer further comprises a first switching means for switching the illumination source on and off.

In some embodiments, the illumination source is selected from the group consisting of: a light-emitting diode, an electroluminescent panel, a cold cathode fluorescent lamp, a hot cathode fluorescent lamp, an external electrode fluorescent lamp and an incandescent light bulb.

In some embodiments, the infrared filter is selected from the group consisting of: a dichroic mirror and one or more optical lenses.

In some embodiments, the LCD assembly further comprises a moving mechanism operatively coupled with the dual-mode infrared filter, wherein the moving mechanism is configured to move the dual-mode infrared filter into and out of the path of light emanating from the first illumination source.

In some embodiments, the first backlight layer further comprises a lightguide panel, wherein the first illumination source is positioned at an edge of the lightguide panel, and wherein the lightguide panel is configured to diffuse said light emanating from the first illumination source on said LCD panel.

In some embodiments, the LCD assembly further comprises a second backlight layer positioned beneath the LCD panel, the backlight layer comprising: a second illumination source configured to illuminate the LCD panel; a second switching means for switching the second illumination source on and off.

In some embodiments, the first backlight layer is positioned beneath the second backlight layer with respect to the LCD panel.

In some embodiments, the first backlight layer is positioned over the second backlight layer with respect to the LCD panel.

In some embodiments, the first backlight layer further comprises a first switching means for switching the first illumination source on or off.

In some embodiments, the first illumination source is selected from the group consisting of: a light-emitting diode, an electroluminescent panel, a cold cathode fluorescent lamp, a hot cathode fluorescent lamp, an external electrode fluorescent lamp and an incandescent light bulb.

In some embodiments, the LCD assembly further comprises a second illumination source, and wherein: if the mode selection is night vision, further setting the second illumination source to a disabled mode; if the mode selection is daylight vision, further setting the second illumination source to a disabled mode; and if the mode selection is strong daylight vision, further setting the second illumination source to an enabled mode.

In some embodiments, if the mode selection is daylight vision, setting the first illumination source and the dual-mode filter to a disabled mode and setting the second illumination source to an enabled mode.

In some embodiments, the mode selection is received manually from a user.

In some embodiments, the LCD assembly further comprises a light indicator, and wherein the mode selection is received automatically based on an indication of the light indicator.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Standard displays such as cold cathode fluorescent lamp (CCFL), LCD, cathode ray tube (CRT), etc., may emit high levels of IR radiation. The high level of IR radiation may interrupt the view of observer equipped with a night vision device (NVD) by causing washed out view and/or over saturated display. These phenomena may be consequent from the NVD work principle of amplifying IR radiation. In order to allow the use of NVD at low light conditions, the disclosed method and LCD assemblies may utilize an IR filter which may reduce the high level of IR radiation, by filtering the IR light spectrum to at least a level that may be amplified by the NVD without causing a washed out view and/or an over saturated display. However, an IR filter may additionally filter portions of the visible spectrum, thus reducing the illumination intensity of the LCD display.

Disclosed herein are methods and LCD assemblies which may allow efficient use of an LCD display during various light conditions. An LCD assembly according to the disclosed embodiments may include an LCD display (will be also referred to herein below as an LCD panel) and one or more backlight layers. One of the backlight layers may include a dual-mode infrared (IR) filter for night vision imaging system (NVIS) applications. The dual-mode IR filter may be set to an enabled mode during low ambient light conditions, to substantially reduce or eliminate the emission of IR radiation. Consequently, one may use night vision devices, such as night vision goggles, in order to view the LCD display. Furthermore, during strong ambient light conditions, more than one backlight layers (thus, multiple illumination sources) may be used in order to enhance the illumination intensity (i.e., brightness) of the LCD display. The illumination enhancement may overcome the strong ambient light and produce a viewable display. The dual-mode IR filter may be then set to a disabled mode, in order to prevent filtering of visible light and thus allow an efficient use of the backlight layer, which includes the dual-mode IR filter, also during day time.

The term "night vision", as referred to herein may relate to vision in relatively low ambient light conditions performed by using night vision devices (NVDs), as known in the art. Such low ambient light conditions may exist, for example, in nighttime, in a dark room, etc.

The term "daylight vision", as referred to herein, may relate to vision in ordinary ambient light conditions. Such ordinary ambient light conditions may exist, for example, in a shaded zone at daytime, in a lighted room, etc.

Figure 1:
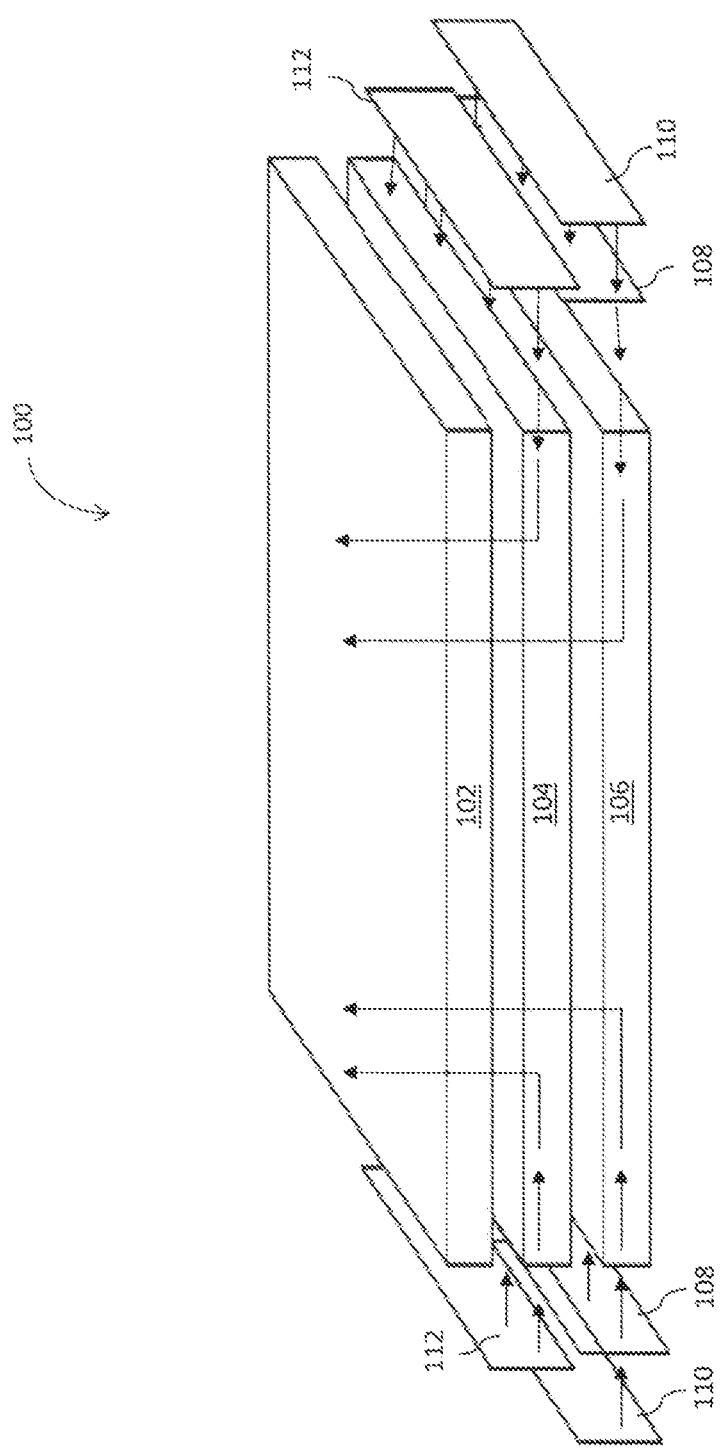
FIG. 1 shows an illustration of a perspective and exploded view of an exemplary LCD assembly including two backlight layers and an IR filter in one of the layers.

The term "strong daylight vision", as referred to herein, may relate to vision in strong ambient daylight conditions. Such a strong ambient daylight conditions may exist, for example, in a strong daylight, or by an intense illumination source, etc. Reference is now made to FIG. 1, which shows an illustration of a perspective and exploded view of an exemplary LCD assembly 100, which includes two backlight layers and an IR filter in one of the layers.

LCD assembly 100 may include an LCD panel 102. LCD assembly 100 may further include a first backlight layer, which may include two illumination sources such as illumination sources 110 and two dual-mode IR filters such as dual-mode IR filters 108 (i.e. each for each illumination source 110). LCD assembly 100 may also include a second backlight layer, which may include an illumination source 112. In some embodiments LCD assembly 100 may include only one or more than two backlight layers. The operation of the first and second backlight layers may be triggered by one or more indicators such as a switch, a light sensor, etc (not shown).

Optionally, the first backlight layer may include a light diffuser such as lightguide 106. In some embodiments, the first backlight layer may include only one or more than two illumination sources and only one or more than two dual-mode IR filters correspondingly.

Illumination sources 110 may include, for example, LEDs (light emitting diodes), CCFL, an Electro-luminescent panel, etc. Illumination sources 110 may be installed in a lateral configuration. Thus, illumination sources 110 may be installed in opposite sides of the first backlight layer in order to provide illumination from two directions. Optionally, illumination sources 110 may include one or more illumination sources and may be installed in various configurations. For example, illumination sources 110 may be a peripheral illumination source, an array illumination source, a matrix illumination source, etc. The first backlight layer may be positioned beneath the LCD panel. Illumination source 110 may be switched on and off by a first switching means, which may be manual or automatic, such as a manual switch and/or an electronic sensor (e.g., a light sensor).

Each of dual-mode IR filters 108 may be an IR spectrum blocking filter and may include, for example, a dichroic mirror, one or more optical lenses such as lenses with a dielectric oxide coating, or a combination thereof. Dual-mode IR filters 108 may have two modes of operation, an enabled mode and a disabled mode. When dual-mode IR filters 108 are in enabled mode, they filter the light emanating from illumination sources 110 correspondingly. When dual-mode IR filters 108 are in disabled mode, they do not filter the light emanating from illumination sources 110 correspondingly, thus allowing a complete spectrum of the light to reach LCD panel 102. In some embodiments, the enabled mode may be achieved by positioning dual-mode IR filters 108 in the path of light emanating from illumination sources 110 correspondingly and before the light reaches LCD panel 102. The disabled mode may be then achieved by positioning dual-mode IR filters 108 out of the path of light emanating from illumination sources 110, correspondingly. In some embodiments, LCD assembly 100 may further include a moving mechanism, which may be operatively coupled with dual-mode IR filters 108. The moving mechanism may be configured to move dual-mode IR filters 108 into and out of the path of light emanating from illumination sources 110. Various suitable moving mechanisms may be used, as known in the art. For example, the moving mechanism may include a movable arm operatively coupled with IR filters 108. The arm may be moved mechanically or electronically, for example, by a piezoelectric motor.

Lightguide panel 106 may be a light diffuser which may spread the light evenly across LCD panel 102. Lightguide panel 106 may be made from acrylic resin, polycarbonate, epoxies, and/or glass designated layer. Lightguide panel 106 may diffuse the light from illumination sources 110 which may be positioned at opposing edges of lightguide panel 106.

Illumination source 112 may be an illumination source such as illumination sources 110 or alike. Illumination source 112 may be configured to illuminate the LCD panel at daylight vision conditions. Illumination source 112 may be switched on and off by a second switching means, manual or automatic, such as a manual switch and/or an electronic sensor (e.g., a light sensor). When night vision is required, illumination source 110 may be triggered on and illumination source 112 may be triggered off. When daylight vision is required, illumination source 112 may be triggered on and illumination source 110 may be triggered off. When a strong daylight vision is required, illumination source 110 may be triggered on and illumination source 112 may be triggered on as well. When both of the illumination sources are triggered on, there may be enough illumination to produce a viewable display in strong daylight vision conditions. Dual-mode IR filters 110 may be then set to a disabled mode. That is since dual-mode IR filters 110 may additionally filter a portion of the visible spectrum, thus decreasing the intensity of the illumination received from illumination sources 110. Disabling dual-mode IR filters 110 may allow the transfer of the complete visible light spectrum from illumination sources 110 without any interference. The transfer of the complete visible spectrum may allow a more efficient use of illumination sources 110. The second backlight layer may include an optional light diffuser such as lightguide panel 104 (or simply lightguide 104) which may be a light diffuser such as lightguide panel 106 or alike. The second backlight layer may be positioned beneath the LCD panel. Lightguide 104 may transfer light arriving from lightguide 106. For example, lightguide 104 may be transparent and may be located above lightguide 106, as shown in FIG. 1. Thus, light diffused by lightguide 106 may arrive perpendicularly to lightguide 104 and pass through it towards LCD panel 102, as indicated by arrows in FIG. 1.

LCD assembly 100 may be configured such that the first backlight layer is positioned beneath the second backlight layer with respect to the LCD panel, or such that the first backlight layer is positioned over the second backlight layer with respect to the LCD panel.

LCD assembly 100 may allow changing its operation mode by a user or automatically, e.g., by an electronic controller. The electronic controller may be used to trigger illumination sources 110, 112 on and off, and/or enable or disable dual-mode IR filters 108 according to an indication, for example, from the electronic sensor. In order to enable night vision in low light conditions, dual-mode IR filters 108 may be set to enabled mode.

Figure 2:
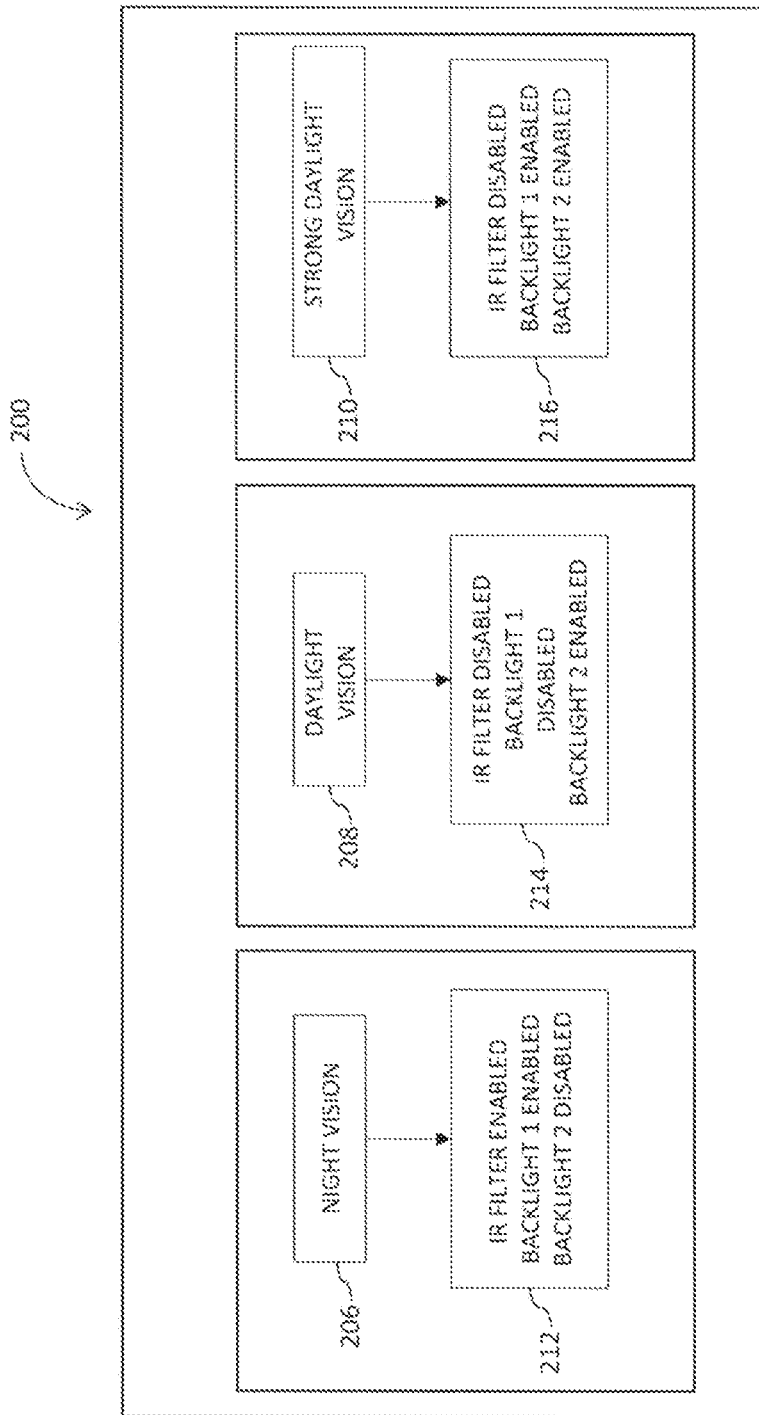
FIG. 2 shows a flowchart presenting exemplary configuration of an LCD assembly which includes two backlights layers and an IR filter in one of the layers.

Reference is now made to FIG. 2, which shows a block diagram 200 presenting exemplary modes of operation of an LCD assembly which includes two backlight layers and a dual-mode IR filter in one of the layers. The LCD assembly may include an LCD panel, where the backlight layers may be configured to illuminate the LCD panel. For example, the LCD assembly may include a first backlight layer (indicated as "backlight 1" in the Figure) and a second backlight layer (indicated as "backlight 2" in the Figure). The first backlight layer may include the dual-mode IR filter. The LCD assembly may be similar to LCD assembly 100 of FIG. 1. The change in mode may be activated manually by a trigger such as a switch and/or automatically by an electronic sensor such as a light sensor.

Night vision mode 206 may be used when night vision is required, i.e., to enable a user to use an NVD such as night vision goggles.

Night vision mode 206 may be received by setting the LCD assembly according to settings 212. Settings 212 may include setting the dual-mode IR filter and an illumination source of the first backlight layer to an enabled mode and setting an illumination source of the second backlight layer to a disabled mode.

Daylight vision mode 208 may be used when daylight vision is required, i.e., to enable a user to use the LCD assembly in a regular ambient daylight.

Daylight vision mode 208 may be received by setting the LCD assembly according to settings 214. Settings 214 may include setting the illumination source and the dual-mode IR filter of the first backlight layer to a disabled mode and the illumination source of the second backlight layer to an enabled mode.

Strong daylight vision mode 210 may be used when strong daylight vision is required, i.e., to enable a user to use the LCD assembly in strong ambient daylight conditions. Strong daylight vision mode 210 may be received by setting the LCD assembly according to settings 216. Settings 216 may include setting the illumination source of the first backlight layer and the illumination source of the second backlight layer to an enabled mode and setting the dual-mode IR filter to a disabled mode. The use of the two backlight layers may overcome the strong ambient light and produce a viewable display of the LCD panel.

Figure 3:
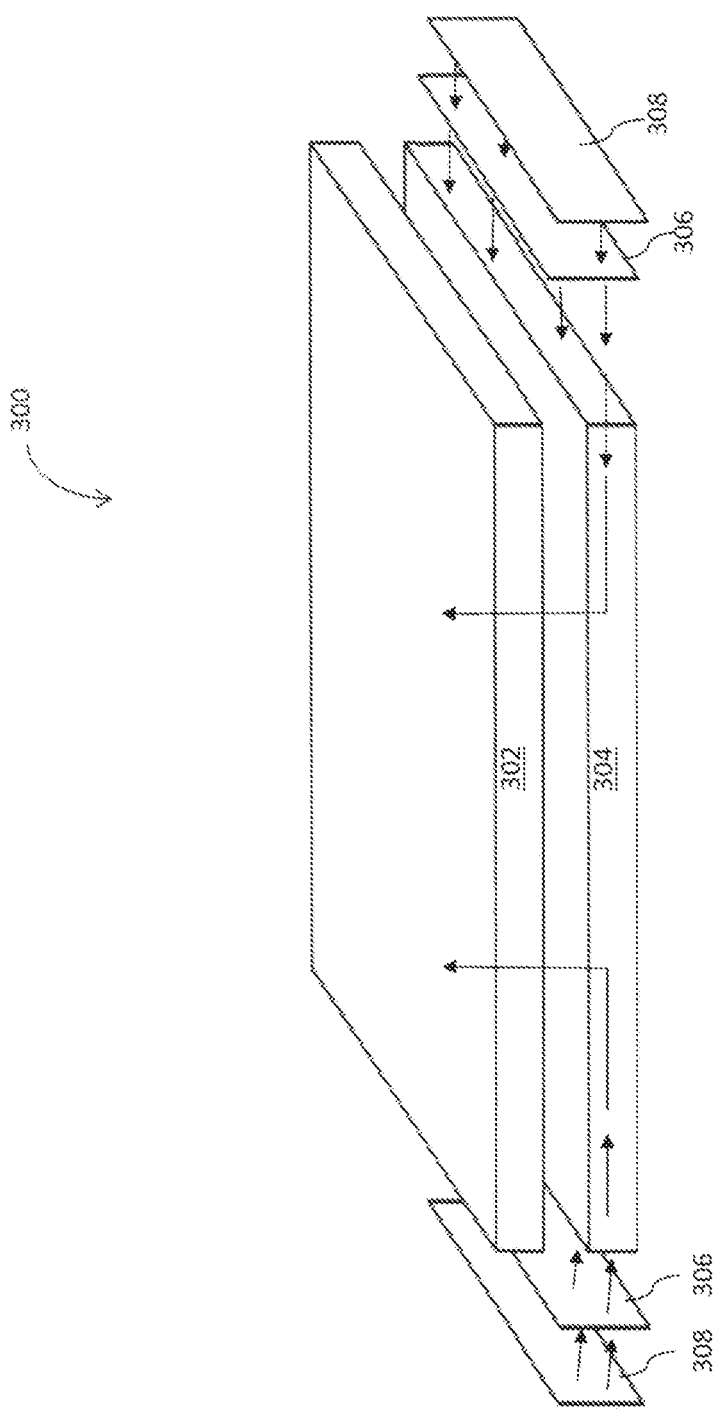
FIG. 3 shows an illustration of a perspective and exploded view of an exemplary LCD assembly including a backlight layer, which includes an IR filter.

Reference is now made to FIG. 3, which shows a perspective and exploded view of an exemplary LCD assembly 300. LCD assembly 300 may include the same elements with the same names as shown in FIG. 1 with respect to LCD assembly 100.

LCD assembly 300 may include an LCD panel 302 and a backlight layer (not indicated). The backlight layer may include an illumination source 308, a dual-mode IR filter 306 and an optional light guide 304. The backlight layer may be similar to the first backlight layer of LCD assembly 100.

In some embodiments LCD assembly 300 may also include an additional illumination source that may be activated in strong daylight vision conditions. LCD assembly 300 may enable a night vision in an LCD display such as a tablet computer, a smart-phone, etc. with a use of an NVD such as NVG.

Figure 4:
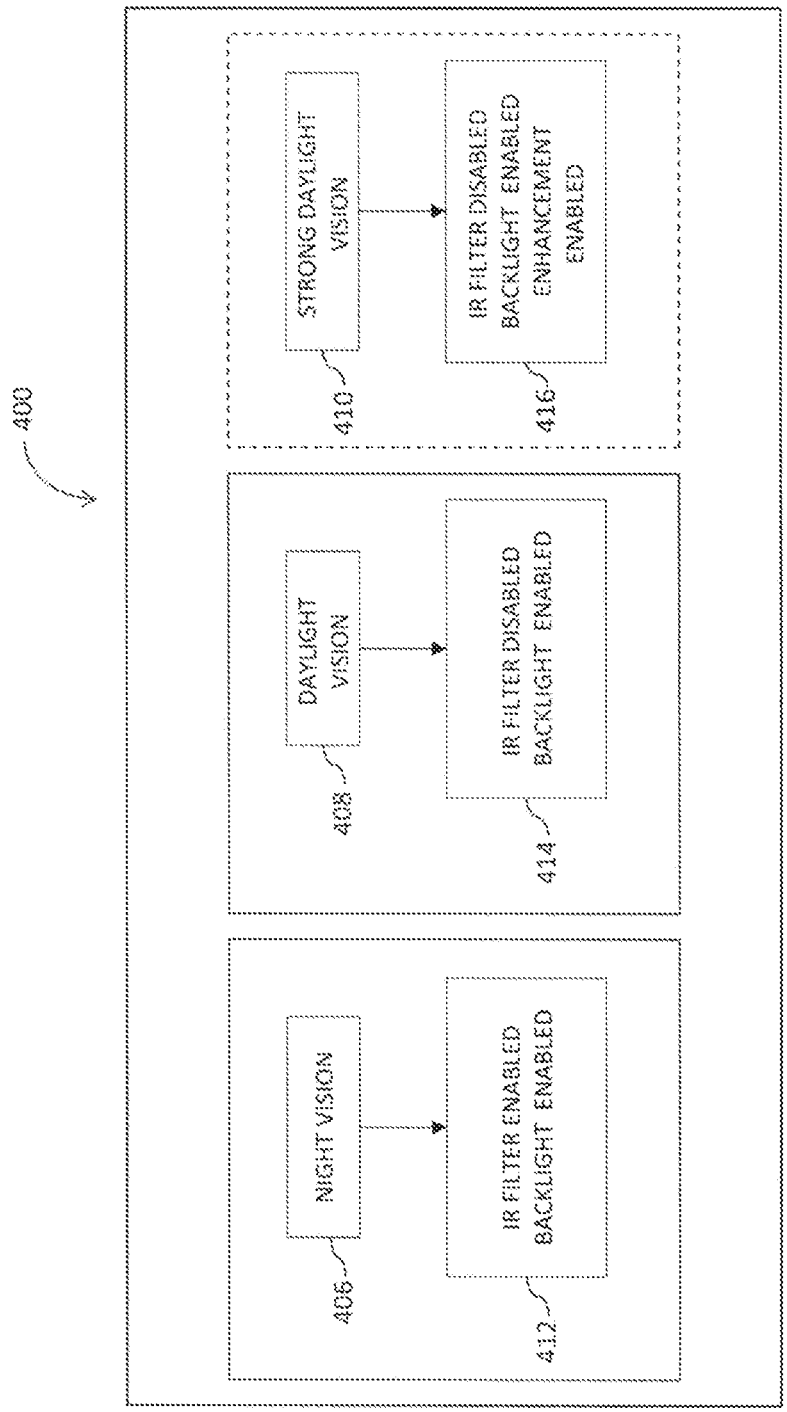
FIG. 4 shows a flowchart presenting exemplary configuration of an LCD assembly including one backlight layer, which includes an IR filter.

Reference is now made to FIG. 4, which shows a block diagram 400 presenting exemplary modes of operation of an LCD assembly which includes one backlight layer. The backlight layer may include a dual-mode IR filter and an illumination source. The LCD assembly may include an LCD panel, where the illumination source may be configured to illuminate the LCD panel. The LCD assembly may be similar to LCD assembly 300 of FIG. 3. The change in modes may be performed manually by a trigger such as a switch and/or automatically by an electronic sensor such as a light sensor.

Night vision mode 406 may be used in low ambient light conditions to enable a user to use an NVD such as night vision goggles. Night vision mode 406 may be received by setting the LCD assembly according to settings 412. Settings 412 may include setting the illumination source and the dual-mode IR filter of the backlight layer to an enabled mode.

Daylight vision mode 408 may be used in regular ambient light conditions. Daylight vision mode 408 may be received by setting the LCD assembly according to settings 414. Settings 414 may include setting the illumination source of the backlight layer to an enabled mode and setting the dual-mode IR filter to a disabled mode in order to prevent filtering of visible light.

Optional strong daylight vision mode 410, may be used in strong ambient light conditions. Such a mode may be used if the LCD assembly includes additional enhancement components, which may enhance the illumination of the LCD panel. Such additional enhancement components may include additional illumination sources, e.g., embedded in an additional backlight layer. Strong daylight vision mode 410 may be received by setting the LCD assembly according to settings 416. Settings 416 may include setting the illumination source of the backlight layer and any such illumination enhancement to an enabled mode and setting the dual-mode IR filter to a disabled mode in order to prevent the filtering of visible light.

In a configuration of an LCD assembly which includes two or more backlight layers, such as LCD assembly 100 of FIG. 1, the backlight layer which includes a dual-mode IR filter may be a built-in layer or an add-on layer. Thus, an LCD device which includes an LCD panel and a backlight layer, such as a smart-phone or a tablet computer, may be adapted to be used with an NVD by operatively coupling the LCD device with such an add-on backlight layer.

Figure 5:
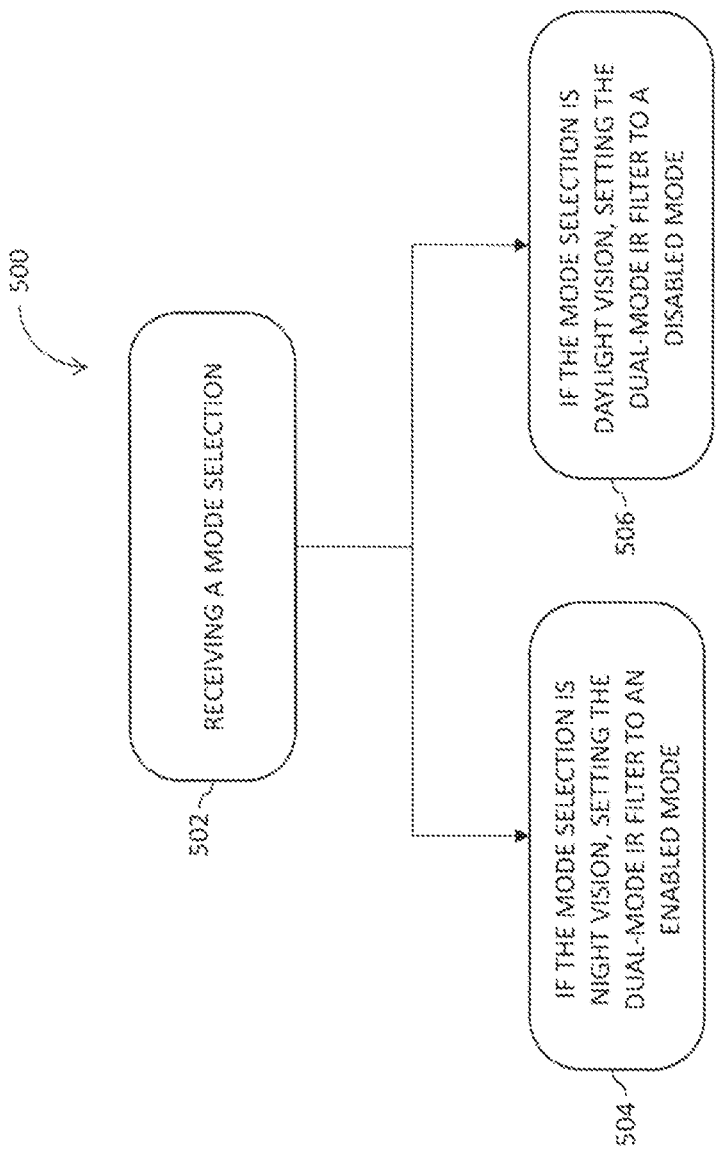
FIG. 5 shows a flowchart of an exemplary method for operating an LCD assembly, according to an embodiment.

Reference is now made to FIG. 5, which shows a flowchart of an exemplary method 500 for operating an LCD assembly, according to an embodiment. The method may be similar to the manner of operation described above with respect to LCD assembly 100 of FIG. 1 and/or LCD assembly 300 of FIG. 3. The LCD assembly may include a backlight layer operatively coupled with an LCD panel. The backlight layer may include a first illumination source configured to illuminate the LCD panel and a dual-mode infrared filter. When the dual-mode infrared filter is in an enabled mode, the dual-mode infrared filter may be positioned in the path of the light emanating from the first illumination source and before the light reaches the LCD panel, thus filtering an infrared spectrum of the light. When the dual-mode infrared filter is in a disabled mode, the dual-mode infrared filter may be positioned out of the path of light emanating from the first illumination source, thus allowing a complete spectrum of the light to reach the LCD panel. With reference to FIG. 1, LCD panel 102 is operatively coupled with the first backlight layer, which includes illumination sources 110 and dual-mode IR filters 108. The backlight layer may be a built-in layer or an add-on layer with respect to the LCD assembly.

In a step 502, a mode selection may be received. The mode selection may be night vision mode or daylight vision mode. In some embodiments, the mode selection may be received manually from a user. For example, a user may push a button or move a switch. In some embodiments, the LCD assembly may further include a light indicator. The mode selection may be then received automatically based on an indication of the light indicator. The light indicator may be, for example, a light sensor, which indicated the level of light surrounding the LCD assembly.

In a step 504, if the mode selection is night vision, the first illumination source and the dual-mode infrared filter may be set to an enabled mode. The LCD panel may be illuminated by the first illumination source. For example, the dual-mode IR filter may be positioned in the path of the light emanating from the first illumination source. Consequently, the dual-mode IR filter may reduce the high level of IR radiation. The reducing of IR radiation level may allow using night vision devices. With reference to FIG. 1, dual-mode IR filters 108 may be set to enabled mode in order to filter light emanating from illumination sources 110.

In a step 506, if the mode selection is daylight vision, the first illumination source may be set to an enabled mode and the dual-mode filter may be set to a disabled mode. Thus, the LCD panel may be illuminated by the first illumination source without interference. For example, dual-mode IR filter may be positioned out of the path of the light emanating from the first illumination source in order to prevent filtering of visible light and thus allow an efficient use of the backlight layer in daylight conditions. With reference to FIG. 1, dual-mode IR filters 108 may be set to a disabled mode (e.g., by repositioning dual-mode IR filters 108) such that light emanating from illumination sources 110 may reach LCD panel 102 without being filtered by dual-mode IR filters 108.

In some embodiments, the LCD assembly may further include a second illumination source. Hence, if the mode selection is night vision, the second illumination source may be set to a disabled mode; if the mode selection is daylight vision, the second illumination source may be set to a disabled mode; and if the mode selection is strong daylight vision, the second illumination source may be set to an enabled mode. Alternatively, if the mode selection is daylight vision, the first illumination source and the dual-mode filter may be set to a disabled mode and the second illumination source may be set to an enabled mode.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. In the description and claims of the application, each of the words "comprise" "include" and "have", and forms thereof, are not necessarily limited to members in a list with which the words may be associated. In addition, where there are inconsistencies between this application and any document incorporated by reference, it is hereby intended that the present application controls.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the market site, or to enable others of ordinary skill in the art to understand the embodiments disclosed herein.

What is claimed is:

1. A method for operating an LCD assembly, the LCD assembly comprising a backlight layer operatively coupled with an LCD panel, the backlight layer comprising (a) a first and a second illumination sources configured to illuminate the LCD panel, and (b) a dual-mode infrared filter, the method comprising using at least one hardware processor for:

receiving a mode selection;
if the mode selection is night vision, setting the first illumination source and the dual-mode infrared filter to an enabled mode; and
if the mode selection is daylight vision, setting the first illumination source to an enabled mode and the dual-mode filter to a disabled mode,
wherein:
when the dual-mode infrared filter is in an enabled mode, the dual-mode infrared filter is positioned in the path of the light emanating from the first illumination source and before the light reaches the LCD panel, thereby filtering an infrared spectrum of the light, and when the dual-mode infrared filter is in a disabled mode, the dual-mode infrared filter is positioned out of the path of light emanating from the first illumination source, thereby allowing a complete spectrum of the light to reach the LCD panel,
if the mode selection is night vision, further setting the second illumination source to a disabled mode,
if the mode selection is daylight vision, further setting the second illumination source to a disabled mode, and
if the mode selection is strong daylight vision, further setting the second illumination source to an enabled mode.

2. The method of claim 1, wherein if the mode selection is daylight vision, setting the first illumination source and the dual-mode filter to a disabled mode and setting the second illumination source to an enabled mode.

3. The method of claim 1, wherein the mode selection is received manually from a user.

4. The method of claim 1, wherein the LCD assembly further comprises a light indicator, and wherein the mode selection is received automatically based on an indication of the light indicator.

* * * * *